(12) United States Patent
Pentheroudakis

(10) Patent No.: US 6,192,333 B1
(45) Date of Patent: Feb. 20, 2001

(54) SYSTEM FOR CREATING A DICTIONARY

(75) Inventor: Joseph E. Pentheroudakis, Seattle, WA (US)

(73) Assignee: Microsoft Corporation, Redmond, WA (US)

(*) Notice: Under 35 U.S.C. 154(b), the term of this patent shall be extended for 0 days.

(21) Appl. No.: 09/076,163

(22) Filed: May 12, 1998

(51) Int. Cl.⁷ .................................................. G06F 17/21
(52) U.S. Cl. ................................................................ 704/10
(58) Field of Search .................... 704/1, 7–10; 707/530, 707/532, 531, 536, 500, 100

(56) References Cited

U.S. PATENT DOCUMENTS

| | | | |
|---|---|---|---|
| 4,862,408 | * | 8/1989 | Zamora ..................................... 704/9 |
| 4,887,212 | * | 12/1989 | Zamora et al. ............................ 704/9 |
| 5,099,426 | * | 3/1992 | Carlgren et al. .......................... 704/9 |
| 5,229,936 | * | 7/1993 | Decker et al. ........................... 704/10 |
| 5,251,316 | * | 10/1993 | Anick et al. .............................. 704/9 |
| 5,412,567 | * | 5/1995 | Kartunen .................................. 704/9 |
| 5,724,594 | * | 3/1998 | Pentheroudakis ...................... 704/10 |
| 5,794,177 | * | 8/1998 | Carus et al. .............................. 704/9 |
| 5,845,306 | * | 12/1998 | Schabes et al. ......................... 704/10 |
| 5,873,660 | * | 3/1999 | Walsh et al. ............................ 400/63 |
| 5,940,624 | * | 8/1999 | Kadashevich et al. ................... 704/9 |
| 5,995,922 | * | 11/1999 | Pentheroudakis et al. ............. 704/10 |

FOREIGN PATENT DOCUMENTS 0 282 721 A2   9/1988   (EP) ................................ G06F/15/20

OTHER PUBLICATIONS

Sproat,R., "Morphology and Computation." The MIT Press 1992. pp. 5–7 and 33–34.*
Riloff et al., "Automated Dictionary Construction for Information Extraction from Text", *Proceedings of the Ninth Conference on Artificial Intelligence for Applications*, Mar. 1–5, 1993, pp. 93–99.
Chen et al., "Automatic Thesaurus Generation for an Electronic Community System", *Journal of the American Society for Information Science*, vol. 46, No. 3, 1995, pp. 175–193.
Xu et al., "Corpus–based Stemming Using Coocurrence of Word Variants", *ACM Transactions on Information Systems*, vol. 16, No. 1, Jan. 1998, pp. 61–81.
Kuhlen, : Morphological relations by Reduction Algorithms, *Database Inspec 'Online! Institute of Electrical Engineers, Stevenage, GB*, Inspec No. 700999, Nachrichten Für Dokumentation, vol. 25, No. 4, 1974, pp. 168–172.

* cited by examiner

*Primary Examiner*—Forester W. Isen
*Assistant Examiner*—Patrick N. Edouard
(74) *Attorney, Agent, or Firm*—Westman, Champlin & Kelly, P.A.

(57) ABSTRACT

A computer readable medium has computer executable components that include a morphological analyzer capable of using a corpus of words to automatically form a dictionary containing words associated with respective lemmas and respective parts of speech. The computer executable components also include a dictionary analyzer capable of automatically improving such a dictionary.

22 Claims, 10 Drawing Sheets

| WORD | LEMMA | PART-OF-SPEECH | |
|---|---|---|---|
| ARREST | ARR | ADJ | 158 |
| ARRESTED | ARRESTE | VERB | 160 |
| ARRESTED | ARREST | VERB | 162 |
| ARRESTING | ARRESTE | VERB | 164 |
| ARRESTING | ARREST | VERB | 166 |
| ARRESTS | ARREST | VERB | 168 |
| ARRESTS | ARREST | NOUN | 170 |

FIG. 4

| WORD | LEMMA | PART-OF-SPEECH |
|---|---|---|
| ARREST | ARR | ADJ |
| | | |
| ARREST | ARREST | ADJ |
| ARREST | ARREST | ADV |
| ARREST | ARREST | NOUN |
| ARREST | ARREST | VERB |
| | | |
| ARRESTED | ARREST | VERB |
| ARRESTED | ARRESTE | VERB |
| | | |
| ARRESTED | ARRESTED | ADJ |
| ARRESTED | ARRESTED | ADV |
| ARRESTED | ARRESTED | NOUN |
| ARRESTED | ARRESTED | VERB |
| | | |
| ARRESTING | ARREST | VERB |
| ARRESTING | ARRESTE | VERB |
| | | |
| ARRESTING | ARRESTING | ADJ |
| ARRESTING | ARRESTING | ADV |
| ARRESTING | ARRESTING | NOUN |
| ARRESTING | ARRESTING | VERB |
| | | |
| ARRESTS | ARREST | NOUN |
| ARRESTS | ARREST | VERB |
| | | |
| ARRESTS | ARRESTS | ADJ |
| ARRESTS | ARRESTS | ADV |
| ARRESTS | ARRESTS | NOUN |
| ARRESTS | ARRESTS | VERB |

FIG. 5

| WORD | LEMMA | PART-OF-SPEECH |
|---|---|---|
| ARREST | ARR | ADJ |
|  |  |  |
| ARREST | ARREST | ADJ |
| ARREST | ARREST | ADV |
| ARREST | ARREST | NOUN |
| ARRESTS | ARREST | NOUN |
| ARREST | ARREST | VERB |
| ARRESTED | ARREST | VERB |
| ARRESTING | ARREST | VERB |
| ARRESTS | ARREST | VERB |
|  |  |  |
| ARRESTED | ARRESTE | VERB |
| ARRESTING | ARRESTE | VERB |
|  |  |  |
| ARRESTED | ARRESTED | ADJ |
| ARRESTED | ARRESTED | ADV |
| ARRESTED | ARRESTED | NOUN |
| ARRESTED | ARRESTED | VERB |
|  |  |  |
| ARRESTING | ARRESTING | ADJ |
| ARRESTING | ARRESTING | ADV |
| ARRESTING | ARRESTING | NOUN |
| ARRESTING | ARRESTING | VERB |
|  |  |  |
| ARRESTS | ARRESTS | ADJ |
| ARRESTS | ARRESTS | ADV |
| ARRESTS | ARRESTS | NOUN |
| ARRESTS | ARRESTS | VERB |

FIG. 6

| WORD | LEMMA | PART-OF-SPEECH | |
|---|---|---|---|
| ARREST | ARR | ADJ | 228 |
|  |  |  |  |
| ~~ARREST~~ | ~~ARREST~~ | ~~ADJ~~ | 222 |
| ~~ARREST~~ | ~~ARREST~~ | ~~ADV~~ | |
| ARREST | ARREST | NOUN | 224 |
| ARRESTS | ARREST | NOUN | 226 |
| ARREST | ARREST | VERB | |
| ARRESTED | ARREST | VERB | |
| ARRESTING | ARREST | VERB | |
| ARRESTS | ARREST | VERB | |
|  |  |  | |
| ARRESTED | ARRESTE | VERB | |
| ARRESTING | ARRESTE | VERB | |
|  |  |  | |
| ~~ARRESTED~~ | ~~ARRESTED~~ | ~~ADJ~~ | |
| ~~ARRESTED~~ | ~~ARRESTED~~ | ~~ADV~~ | |
| ~~ARRESTED~~ | ~~ARRESTED~~ | ~~NOUN~~ | |
| ~~ARRESTED~~ | ~~ARRESTED~~ | ~~VERB~~ | |
|  |  |  | |
|  |  |  | |
| ~~ARRESTING~~ | ~~ARRESTING~~ | ~~ADJ~~ | |
| ~~ARRESTING~~ | ~~ARRESTING~~ | ~~ADV~~ | |
| ~~ARRESTING~~ | ~~ARRESTING~~ | ~~NOUN~~ | |
| ~~ARRESTING~~ | ~~ARRESTING~~ | ~~VERB~~ | |
|  |  |  | |
| ~~ARRESTS~~ | ~~ARRESTS~~ | ~~ADJ~~ | |
| ~~ARRESTS~~ | ~~ARRESTS~~ | ~~ADV~~ | |
| ~~ARRESTS~~ | ~~ARRESTS~~ | ~~NOUN~~ | |
| ~~ARRESTS~~ | ~~ARRESTS~~ | ~~VERB~~ | |

FIG. 7   220

| WORD | LEMMA | PART-OF-SPEECH | |
|---|---|---|---|
| ~~ARREST~~ | ~~ARR~~ | ~~ADJ~~ | — 232 |
|  |  |  | |
| ARREST | ARREST | NOUN | |
| ARRESTS | ARREST | NOUN | |
| ARREST | ARREST | VERB | |
| ARRESTED | ARREST | VERB | |
| ARRESTING | ARREST | VERB | |
| ARRESTS | ARREST | VERB | |
|  |  |  | |
| ~~ARRESTED~~ | ~~ARRESTE~~ | ~~VERB~~ | — 234 |
| ~~ARRESTING~~ | ~~ARRESTE~~ | ~~VERB~~ | — 236 |

FIG. 8   230

| WORD | LEMMA | PART-OF-SPEECH | |
|---|---|---|---|
|  |  |  | 240 |
| ARREST | ARREST | NOUN | — 242 |
| ARRESTS | ARREST | NOUN | — 246 |
| ARREST | ARREST | VERB | — 244 |
| ARRESTED | ARREST | VERB | |
| ARRESTING | ARREST | VERB | |
| ARRESTS | ARREST | VERB | — 248 |

FIG. 9

| WORD | LEMMA | PART-OF-SPEECH | |
|---|---|---|---|
| ARRESTS | ARREST | NOUN | ⎫ 262 |
| ARRESTED | ARREST | VERB | ⎫ 264 |
| ARRESTING | ARREST | VERB | ⎫ 266 |
| ARRESTS | ARREST | VERB | ⎫ 268 |
|  |  |  |  |
| ARRESTED | ARRESTE | VERB | ⎫ 270 |
| ARRESTING | ARRESTE | VERB | ⎫ 272 |

260

| WORD | LEMMA | PART-OF-SPEECH |
|---|---|---|
| ARRESTS | ARREST | NOUN |
| ARRESTED | ARREST | VERB |
| ARRESTING | ARREST | VERB |
| ARRESTS | ARREST | VERB |
|  |  |  |
| ARRESTED | ARRESTE | VERB |
| ARRESTING | ARRESTE | VERB |

FIG. 11    280

| WORD | LEMMA | PART-OF-SPEECH |
|---|---|---|
| ARRESTS | ARREST | NOUN |
| ARRESTED | ARREST | VERB |
| ARRESTING | ARREST | VERB |
| ARRESTS | ARREST | VERB |
|  |  |  |
| ~~ARRESTED~~ | ~~ARRESTE~~ | ~~VERB~~ |
| ~~ARRESTING~~ | ~~ARRESTE~~ | ~~VERB~~ |

| WORD | LEMMA | PART-OF-SPEECH |
|---|---|---|
| ARRESTS | ARREST | NOUN |
| ARRESTED | ARREST | VERB |
| ARRESTING | ARREST | VERB |
| ARRESTS | ARREST | VERB |

SYSTEM FOR CREATING A DICTIONARY

BACKGROUND OF THE INVENTION

The present invention relates to computerized language systems. In particular, the present invention relates to dictionaries used in computerized language systems.

Computerized language systems include a wide array of computer implemented functions that manipulate language to improve communication between a computer and a user. Examples include text-to-speech and speech-to-text converters, as well as natural language systems. In each of these systems, the computer must be able to determine the syntax of a sentence. In speech systems the syntax allows the computer to identify the proper tonal inflection for the speech. In natural language systems, the syntax allows the computer to identify the key words in a sentence.

To determine syntax in a sentence, computerized language systems rely on dictionaries that list valid words for a particular language. Preferably, each dictionary entry indicates the word's part of speech and its stem, also known as its lemma. For example, a dictionary entry for "wash" would indicate that the word is a noun and a verb, while the entry for "elate" would indicate that the word is only a verb.

In the art, such dictionaries are built by hand. This requires a great deal of time, which greatly increases the cost of producing computerized language systems for the various languages of the world.

SUMMARY OF THE INVENTION

A computer readable medium has computer executable components that include a morphological analyzer capable of using a corpus of words to automatically form a dictionary containing words associated with a lemma and a part of speech. The computer executable components also include a dictionary analyzer capable of automatically improving the dictionary.

BRIEF DESCRIPTION OF THE DRAWINGS

FIG. 4 is a portion of a dictionary produced by the morphological analyzer of FIG. 2.

FIG. 5 is the portion of a dictionary of FIG. 4 expanded by inserting default entries for each word in the corpus.

FIG. 6 is a sorted version of the dictionary portion of FIG. 5.

FIG. 7 is the dictionary portion of FIG. 6 showing entries eliminated by step 116 of FIG. 3.

FIG. 8 is the dictionary portion of FIG. 7 after step 118 of FIG. 3.

FIG. 9 is the dictionary portion of FIG. 8 after step 120 of FIG. 3.

FIG. 11 is a portion of a dictionary supplement based on words found in the corpus that are not found in the dictionary at step 122 of FIG. 3.

FIG. 12 is the dictionary supplement of FIG. 11 after step 124 of FIG. 3.

FIG. 13 is the dictionary supplement of FIG. 12 after step 126 of FIG. 3.

DETAILED DESCRIPTION OF THE PREFERRED EMBODIMENTS

Figure 1:
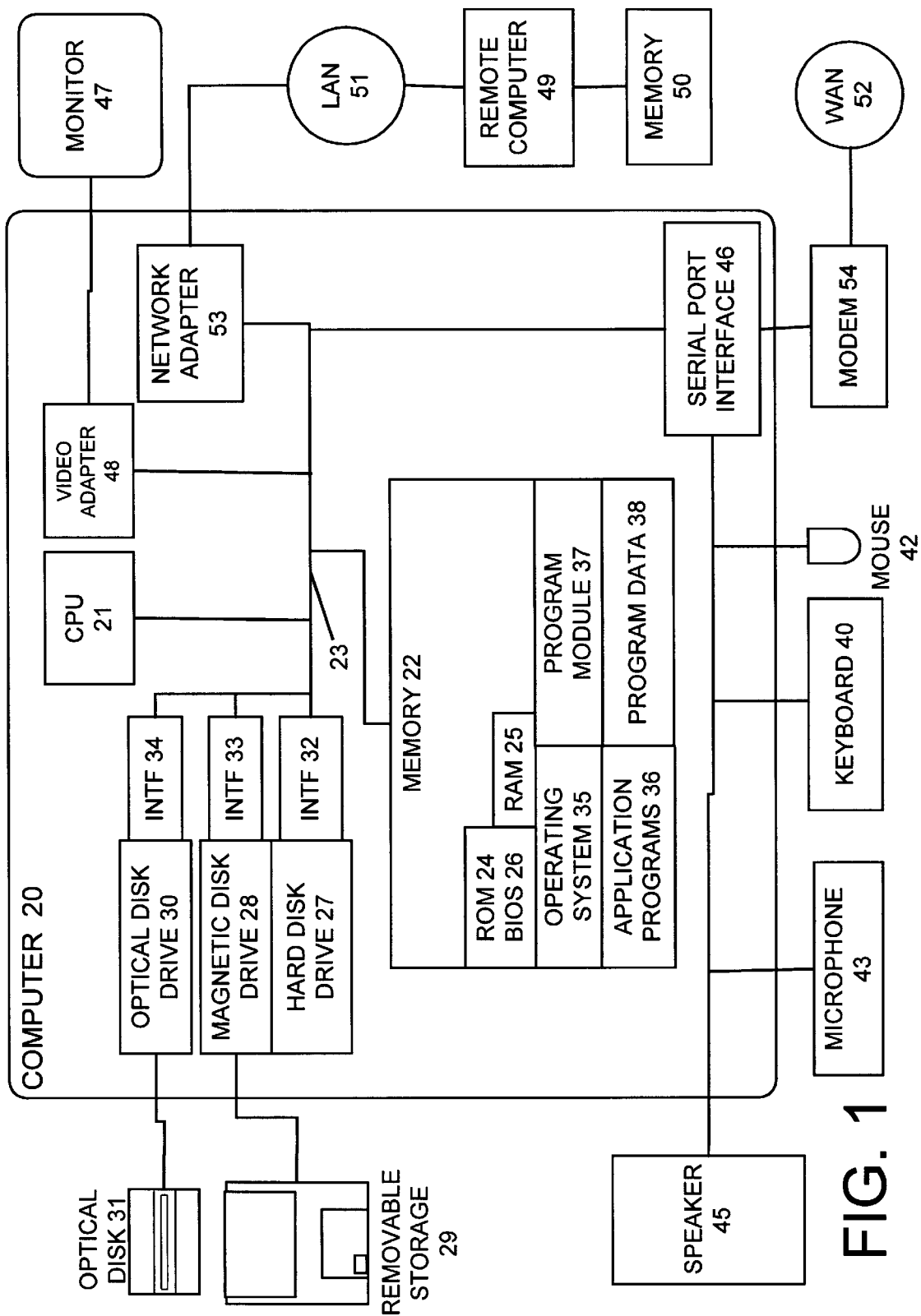
FIG. 1 is a block diagram of an operating environment for the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, main-frame computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

Figure 2:
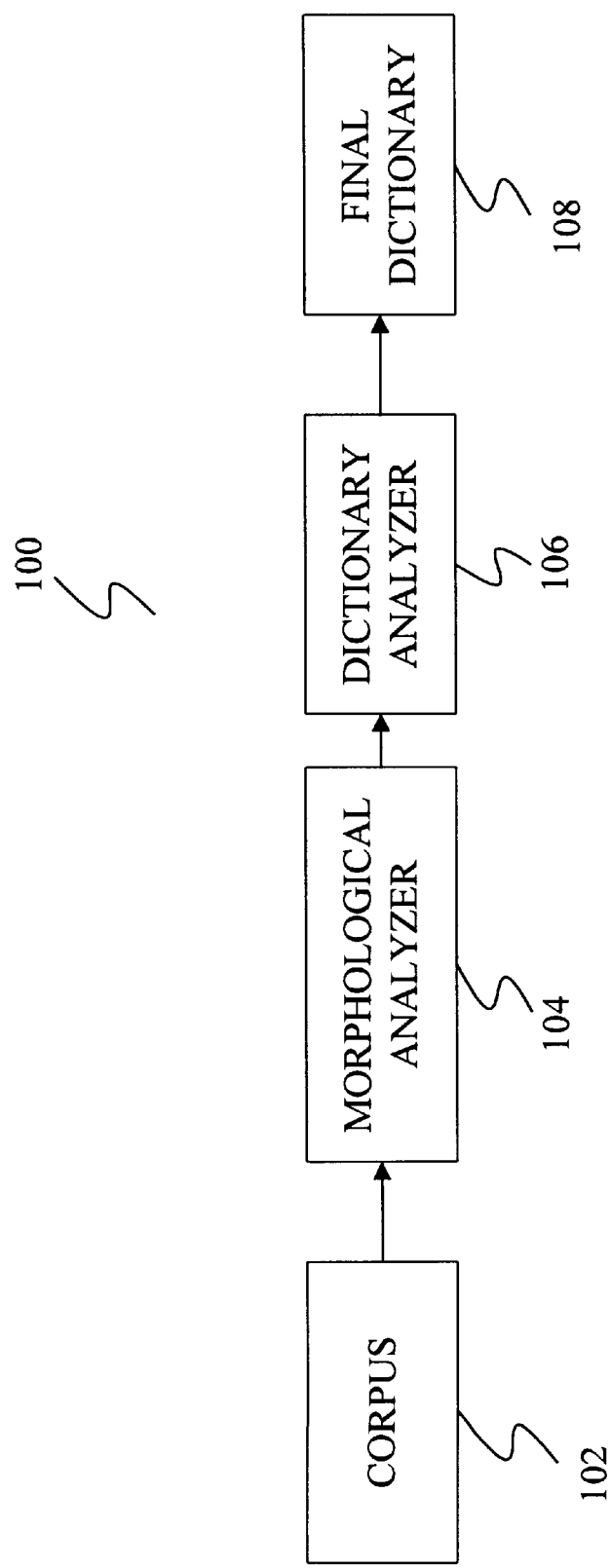
FIG. 2 is a block diagram of the components of the present invention.

FIG. 2 is a block diagram of system 100 of the present invention. A corpus 102 consisting of a large number of words is provided to a morphological analyzer 104. Preferably, corpus 102 consists of words written as sentences. For instance, corpus 102 can include news articles, fictional stories, or instruction booklets. Preferably, corpus 102 consists of at least 1 million words.

Morphological analyzer 104 produces a dictionary of analyses from corpus 102 by applying morphological rules to the words in corpus 102. In preferred embodiments, the analyses for each word are triples having three parts: the word, the word's lemma and the word's part of speech. The rules that morphological analyzer 104 uses to produce the analyses from corpus 102 are developed by a person skilled in the particular language being analyzed. An example rule in English is that words that end in "ed" are commonly verbs and their lemma is formed by either removing the "d" or the "ed".

The dictionary produced by morphological analyzer 104 is passed to dictionary analyzer 106, which improves the dictionary. Dictionary analyzer 106 improves the dictionary by adding a set of default entries and by deleting entries that are unlikely to be valid words in the language. The process used by dictionary analyzer 106 is discussed further below. The results of the improvements provided by dictionary analyzer 106 form final dictionary 108, which can be used in computer language systems. In preferred embodiments, final dictionary 108 only includes one entry for each lemma/part-of-speech pair. The different forms of the lemma that appear in the corpus are generally not stored in final dictionary 108.

Figure 3:
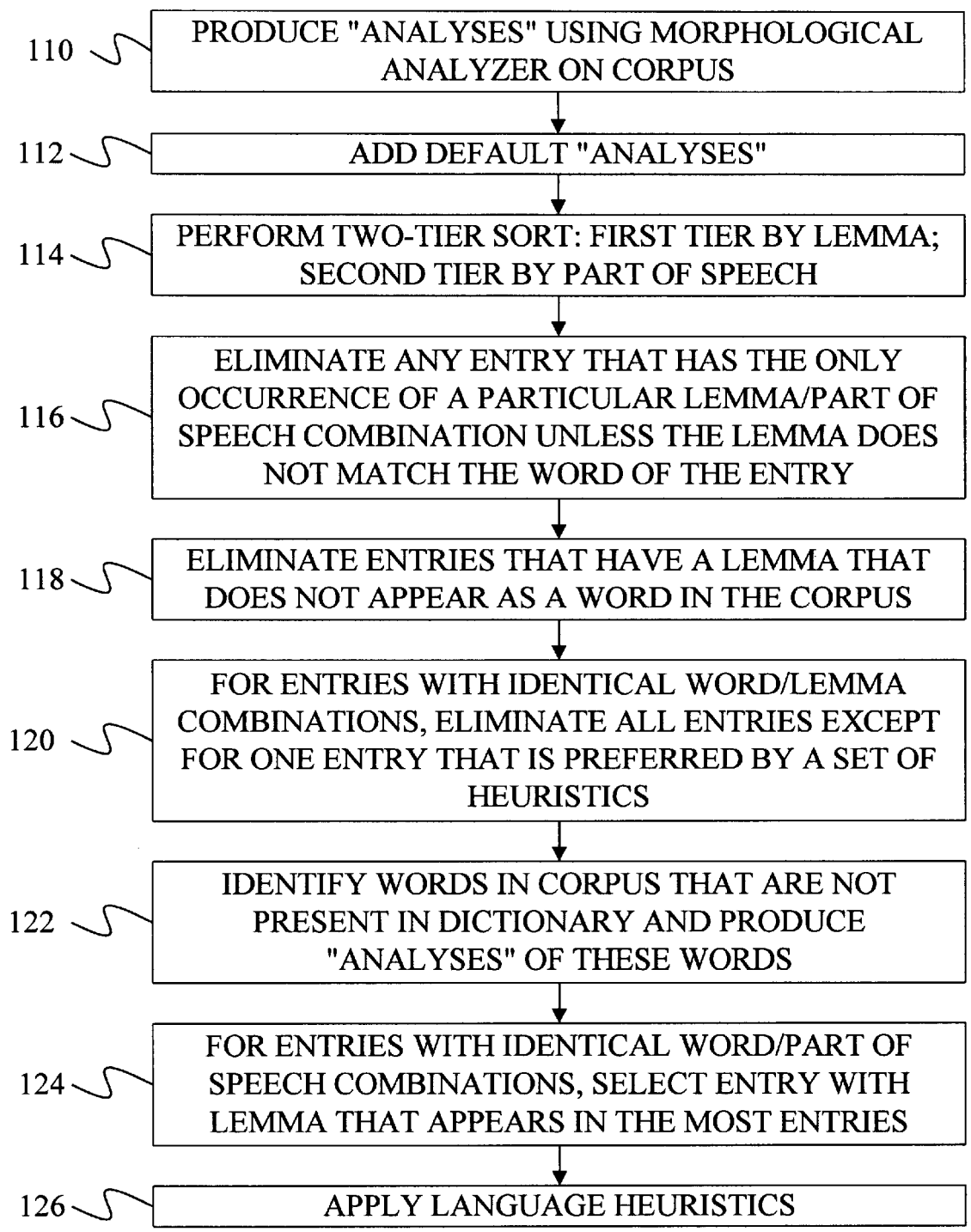
FIG. 3 is a flow diagram of the process of the present invention.

FIG. 3 is a flow diagram of the method of the present invention for automatically producing a dictionary. In step 110 of the process, the morphological analyzer 104 produces a set of analyses using corpus 102 as input. In preferred embodiments, these analyses take the form of triples consisting of a word, a lemma and a part of speech. Examples of such triples are shown in dictionary portion 150 of FIG. 4.

The triples listed in dictionary portion 150 of FIG. 4 are limited to variations of the word "arrest" that appear in corpus 102. Those skilled in the art will recognize that with at least one million words in corpus 102, there are several thousand unique words. As such, morphological analyzer 104 will produce several thousand analyses or triples in its initial dictionary. Since it is impossible to show a complete dictionary, FIG. 4 limits itself to variations of the word "arrest".

In FIG. 4, the three portions of the triples are aligned in three respective columns. Column 152, headed by the identifier "WORD" includes the words of corpus 102. Each word's associated lemma is found in column 154, which is headed by the term "LEMMA". The part of speech assigned to the word by the morphological analyzer is listed in column 156 under the heading "PART-OF-SPEECH".

The results from morphological analyzer 104 that are shown in dictionary portion 150 are illustrative of the errors that morphological analyzer 104 produces in attempting to build a dictionary. For example, in entry 158, the word "arrest" was analyzed by morphological analyzer 104 as being a form of the lemma "arr" and was identified as an adjective. Morphological analyzer 104 guessed that "arrest" was an adjective based on the "est" suffix, which typically is associated with the superlative form of an adjective (as in, for example, "quick"/"quickest").

However, it is clear that arrest is not an adjective and that its lemma is not "arr".

Entries 160 and 162 of dictionary portion 150 illustrate that morphological analyzer 104 provides multiple lemma/word combinations if several analyses are possible, given the morphological rules used. Specifically, for the word "arrested" found both in entries 160 and 162, morphological analyzer 104 used a separate morphological rule for each entry. For entry 160, morphological analyzer 104 used a rule that states that a word ending in "ed" has a lemma that is constructed by dropping the "d" from the word (as in the pair "please"/"pleased"). For entry 162, morphological analyzer 104 used a rule that states that a word ending in "ed" has a lemma that is constructed by dropping the "ed" from the word (as in the pair "walk"/"walked"). Since morphological analyzer 104 cannot tell which rule gives the right lemma in this case, it provides both lemmas. Entries 164 and 166 show similar dual rules for the word "arresting".

Entries 168 and 170 of dictionary portion 150 show that morphological analyzer 104 can assign a single word to two different parts of speech. In English morphological rules, a word ending in "s" can either be the plural of a noun or can be the third person singular of a verb. To cover both situations, morphological analyzer 104 produces two entries for any word ending in "s". In the particular case of entries 168 and 170, morphological analyzer 104 has produced two entries for the word "arrests". Both entries have the same lemma "arrest", but entry 168 identifies the word "arrest" as being a verb and entry 170 identifies the word as being a noun.

Referring to FIG. 3, once morphological analyzer 104 has produced its dictionary of triples, the process continues at step 112 where default analyses, explained below, are added to the dictionary. Default analyses can either be added by morphological analyzer 104 or by dictionary analyzer 106.

FIG. 5 depicts expanded dictionary portion 180, which is dictionary portion 150 expanded by the inclusion of the default triples formed in step 112. Each word found in corpus 102 has an associated set of default triples. For English, each set of default triples consists of four separate triples that each use their respective word as both the WORD and the LEMMA in the triple. Although their WORDs and LEMMAs are the same, each triple in a set of triples has a different part of speech. For example, the word "arrest" in entry 182 has a set of default triples 184 consisting of triples 186, 188, 190 and 192. In each of the triples 186, 188, 190 and 192, "arrest" appears as the WORD in the triple and "arrest" appears as the LEMMA in the triple. However, each of the triples in the set of default triples 184 has a unique part of speech. Thus, in triple 186, "arrest" is identified as an adjective; in triple 188, "arrest" is identified as an adverb; in triple 190, "arrest" is identified as a noun; and in triple 192, "arrest" is identified as a verb. Similarly, sets of default triples 194, 196 and 198 provide default triples for the words "arrested", "arresting" and "arrests", respectively.

The default triples of expanded dictionary portion 180 are added to assist in identifying the correct lemma for a word. As will be discussed below, this is based on the observation that the lemma of a given word will also be present in the corpus. Default triples are an implementation of that hypothesis: at this stage, every word is treated as its own lemma. This will be useful in cases such as entry 182, where morphological analyzer 104 has analyzed the form "arrest" as an adjective with the lemma "arr". As will be shown, the fact that there will be no default triple associated with the form "arr" will be used to reject that analysis. Note, of course, that the creation of the default triples adds many invalid entries to expanded dictionary portion 180 at this stage.

To make it easier to remove the invalid entries from the expanded dictionary, the process of FIG. 3 performs a two-tier sort at box 114. In the first tier of the sort, the entries are sorted in alphabetical order by their lemmas. In the second tier of the sort, the entries for identical lemmas are sorted on their parts of speech.

FIG. 6 shows a dictionary portion 200 which is formed by performing the two-tier sort of step 114 of FIG. 3 on expanded dictionary portion 180 of FIG. 5. For clarity, spaces have been left between groups of entries that share common lemmas. Group 202 is an exemplary group of entries that all share the lemma "arrest". Within group 202, the entries are sorted based on their part of speech to form sub-groups. For example, each of the entries in sub-group 210 has "arrest" as its lemma and "verb" as its part of speech. Similarly, entries in sub-groups 204, 206 and 208 are limited to nouns, adverbs and adjectives, respectively. This is because in English these are the parts of speech that inflect; in other languages, different parts of speech might be used.

Once the entries in the dictionary have been sorted in step 114, dictionary analyzer 106 can begin to eliminate entries that are not likely to be real words in the language. The first step for eliminating such entries is step 116 where entries that have a unique lemma/part of speech combination are eliminated unless their respective lemma is different from their respective word. The effects of step 116 are exemplified in dictionary portion 220 of FIG. 7, which shows the effects of step 116 on dictionary portion 200 of FIG. 6. In dictionary portion 220 of FIG. 7, entries that have been eliminated by step 116 have a line drawn through them.

In dictionary portion 220, entry 222 has been eliminated by step 116 because entry 222 has the only occurrence of "arrest" as a lemma for an adjective and the lemma of entry 222, "arrest", is identical to the word of entry 222. Entry 224 of dictionary portion 220 has not been stricken at step 116 because entry 224 is not the only entry in the dictionary that uses "arrest" as a lemma for a noun. Specifically, entry 226 also uses "arrest" as a lemma for a noun.

Entry 228 of dictionary portion 220 has not been eliminated by step 116 even though it is the only entry in the dictionary that uses "arr" as a lemma for an adjective. The reason entry 228 has not been eliminated is that the lemma for entry 228, "arr", is different from the word for entry 228, "arrest".

Step 116 removes entries based on the assumption that all valid entries for the dictionary will have lemmas that are inflected to produce other words in the dictionary. For example, the lemma of entry 224 is "arrest" which is inflected to form the word "arrests" in entry 226.

After step 116 of FIG. 3, dictionary analyzer 106 advances to step 118 where it eliminates entries that have a lemma that does not appear in corpus 102. Step 118 is best shown using dictionary portion 230 of FIG. 8. In dictionary portion 230 of FIG. 8, the lined entries that appeared in dictionary portion 220 of FIG. 7 have been removed. In addition, entries that are eliminated by step 118 of FIG. 3 have lines drawn through them in dictionary portion 230.

In dictionary portion 230, three entries 232, 234 and 236 are eliminated by step 118. For entry 232, its associated lemma, "arr" does not appear in corpus 102. This is confirmed by the fact that "arr" does not appear as a word in any other entry in the dictionary. Since each word in corpus 102 appears as a word in the dictionary, if a lemma is not found as a word in the dictionary, it does not appear in corpus 102.

Similarly, the lemma "arreste" in entries 234 and 236 does not appear as a word in the dictionary because it does not appear as a word in corpus 102.

After step 118 of FIG. 3, dictionary analyzer 106 proceeds to step 120 where it identifies entries with identical word/ lemma combinations, and for each set of entries that share a word/lemma combination, dictionary analyzer 106 applies language-specific heuristics to determine whether all are valid words in the language.

An example of a language-specific heuristic for English is the following: look if a word has been analyzed as a noun as well as a verb, look for patterns such as "the +lemma", "a +lemma", "many +word" etc. in the corpus. For example, if the pattern "the arrest" is indeed found in the text, the analysis of the word "arrest" as a noun is recognized as valid. FIG. 9 shows the state of the dictionary after dictionary analyzer 106 has applied such heuristics, assuming that the phrase "the arrest" was found in the corpus. In FIG. 9, the lemma "arrest" is associated with both a verb and a noun.

After step 120, dictionary analyzer 106 proceeds to step 122 where it identifies words in corpus 102 that are not present in the dictionary. The dictionary analyzer then produces analyses of these words using morphological analyzer 104. Step 122 is needed because words found in the corpus can be deleted from the dictionary in steps 116, 118 and 120.

Figure 10:
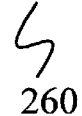
FIG. 10 provides a second dictionary portion for a corpus that lacks the word "arrest".

To understand the need for step 122, dictionary portion 260 of FIG. 10 is provided. Dictionary portion 260 is the same as dictionary portion 230 of FIG. 8 except that, for the purposes of this explanation, in dictionary portion 260 it is assumed that the word "arrest" is not present in the corpus 102 even though the words "arrests", "arrested" and "arresting" are present in corpus 102. With "arrest" not present in the corpus, step 118 of FIG.3 eliminates all entries that have "arrest" as a lemma. As such, entries 262, 264, 266 and 268 would be eliminated from the dictionary along with entries 270 and 272, which have a lemma of "arreste". Thus, if "arrest" does not appear in corpus 102, the words "arrests", "arrested" and "arresting" will be eliminated from the dictionary even though they appear in corpus 102. In order to provide the best possible dictionary, these terms need to be reintroduced into the dictionary.

An example of the analyses produced in step 122 based on the assumption that "arrest" does not appear in the corpus is shown in supplemental dictionary portion 280 of FIG. 11. Specifically, supplemental dictionary portion 280 shows the triples for the words "arrests", "arrested" and "arresting" that appear in the corpus 102 but not in the dictionary.

Once the analyses have been produced in step 122, dictionary analyzer 106 selects one entry from each group of entries that share the same word/part of speech combination. The selection is performed by preferring those entries with lemmas that appear the most in the dictionary.

Supplemental dictionary portion 290 of FIG. 12 shows the effects of step 124 on supplemental dictionary portion 280. In supplemental dictionary portion 290, entries eliminated by step 124 are shown with lines through them.

In step 124, dictionary analyzer 106 looks for entries that have the same word/part-of-speech combination. For example entries 292 and 294 both identify the word "arrested" as being a verb. However, entry 292 predicts that the lemma for "arrested" is "arrest" and entry 294 predicts that the lemma is "arreste".

To choose between entries with the same word/part of speech combination, dictionary analyzer 106 counts the number of times each lemma appears in supplemental dictionary portion 280. It then selects the entry that has the most frequently appearing lemma.

Continuing the example above, in supplemental dictionary portion 280, the lemma "arrest" of entry 292 appears more often than the lemma "arreste" of entry 294. Therefore, dictionary analyzer 106 prefers entry 292 and eliminates entry 294. Similarly, dictionary analyzer 106 prefers entry 296 over entry 298, which both identify the word "arresting" as a verb.

After step 124, dictionary analyzer 106 proceeds to step 126 where it applies the same set of language heuristics discussed in step 120 to determine whether all the entries are valid words in the language. FIG. 13 shows the effects of step 126 with supplemental dictionary portion 300, which is produced from supplemental dictionary portion 290. In supplemental dictionary portion 300, those entries with lines through them in supplemental dictionary portion 290 have been removed.

In supplemental dictionary portion 300, entries 302 and 304 each have "arrest" as a word and have "arrest" as a lemma. However, entry 302 treats "arrest" as a noun and entry 304 treats "arrest" as a verb. Since "arrest" forms both valid nouns and verbs in English, both entries remain in the dictionary after step 126.

Once dictionary analyzer 106 has finished step 126, it adds the supplemental dictionary to the dictionary formed at the end of step 120 to form a complete dictionary. In preferred embodiments, this complete dictionary is reduced by eliminating the "WORD" from each entry to produce entries that only have a lemma and a part of speech. Entries with the same lemma/part of speech pair are then reduced to a single entry.

Although the invention described above has been described with reference to English, those skilled in the art will recognize that the invention can be used with many other languages. Although the morphological analyzer and the language heuristics will change for each language, the basic invention remains the same.

Although the present invention has been described with reference to preferred embodiments, workers skilled in the art will recognize that changes may be made in form and detail without departing from the spirit and scope of the invention.

What is claimed is:

1. A method for creating a dictionary of words for a language, each entry in the dictionary indicating a part of speech for the word and a lemma for the word, the method comprising:
   selecting a corpus of words;
   analyzing the corpus of words with a morphological analyzer to assign a part of speech and a lemma to the words of the corpus to generate a dictionary entry; and
   storing the dictionary entry in the dictionary.

2. The method of claim 1 wherein the morphological analyzer assigns multiple lemmas to a single word in the corpus.

3. The method of claim 2 further comprising removing all but one lemma for each word in the dictionary.

4. The method of claim 1 further comprising generating a default entry in the dictionary for each word in the corpus by using the word itself as a lemma with a default part of speech.

5. The method of claim 4 further comprising generating multiple default entries for each word in the corpus by using the word itself as a lemma with multiple parts of speech, one part of speech per default entry.

6. The method of claim 5 further comprising after generating the multiple default entries deleting those entries having lemmas that only appear once in the dictionary as lemmas and that match their respective word in their respective entry.

7. The method of claim 6 further comprising deleting those entries having lemmas that do not appear in the corpus.

8. The method of claim 7 further comprising selecting to retain in the dictionary one entry between multiple possible entries for a word on the basis of which entry contains a more probable part of speech for the word.

9. The method of claim 8 further comprising comparing the corpus to the dictionary and using the morphological analyzer to generate second pass entries for words that appear in the corpus but not in the dictionary.

10. The method of claim 9 further comprising eliminating all but one entry from multiple second pass entries that have the same word and part of speech.

11. The method of claim 10 wherein the one entry is selected by choosing the entry having a lemma that appears as a lemma in the most entries in the dictionary.

12. A computer readable medium having computer executable components comprising:
   a morphological analyzer capable of using a corpus of words to form a dictionary containing words associated with a lemma and a part of speech; and a dictionary analyzer capable of automatically improving the dictionary.

13. The computer readable medium of claim 12 wherein the dictionary analyzer is capable of improving the dictionary by generating at least one default entry in the dictionary for each word in the corpus, each default entry using its respective word as its lemma.

14. The computer readable medium of claim 13 wherein the dictionary analyzer is capable of improving the dictionary by creating multiple default dictionary entries for each word in the corpus, each of the multiple dictionary entries using the respective word as its own lemma, each default dictionary entry having a unique part of speech among the default entries for a particular word.

15. The computer readable medium of claim 13 wherein the dictionary is capable of improving the dictionary by eliminating an entry from the dictionary.

16. The computer readable medium of claim 15 wherein the dictionary analyzer is capable of improving the dictionary by eliminating entries from the dictionary that have lemmas that only appear once in the dictionary as lemmas and that match their respective words.

17. The computer readable medium of claim 15 wherein the dictionary analyzer is capable of improving the dictionary by eliminating entries with lemmas that do not appear in the corpus.

18. The computer readable medium of claim 15 wherein one of multiple entries for a single word-lemma combination is selected based on a stored rule that favors one part of speech over another.

19. The computer readable medium of claim 15 wherein the dictionary analyzer is capable of improving the dictionary after eliminating an entry by identifying words in the corpus that do not appear in the dictionary.

20. The computer readable medium of claim 19 wherein the dictionary analyzer is capable of improving the dictionary by invoking a morphological analyzer to generate possible dictionary entries for the words that appear in the corpus but not the dictionary.

21. The computer readable medium of claim 20 wherein the dictionary analyzer selects one dictionary entry from the possible dictionary entries for each word.

22. The computer readable medium of claim 21 wherein the dictionary analyzer selects one dictionary entry from the possible dictionary entries by preferring the entry that has a lemma that appears most often in the dictionary.

* * * * *